United States Patent
Apdalhaliem et al.

(10) Patent No.: US 9,682,766 B2
(45) Date of Patent: Jun. 20, 2017

(54) THERMAL BARRIER APPARATUS

(71) Applicant: The Boeing Company, Chicago, IL (US)

(72) Inventors: Sahrudine Apdalhaliem, Seattle, WA (US); Waeil M. Ashmawi, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 171 days.

(21) Appl. No.: 14/746,127

(22) Filed: Jun. 22, 2015

(65) Prior Publication Data

US 2016/0368587 A1    Dec. 22, 2016

(51) Int. Cl.
*B64C 1/14*    (2006.01)

(52) U.S. Cl.
CPC .......... *B64C 1/1484* (2013.01); *B64C 1/1492* (2013.01)

(58) Field of Classification Search
CPC ....... B64C 1/1484; B64C 1/1492; B64C 1/14; B62D 65/06; B64D 15/00; E06B 1/26; E06B 1/36
See application file for complete search history.

(56) References Cited

U.S. PATENT DOCUMENTS

| | | | | |
|---|---|---|---|---|
| 2,473,616 | A * | 6/1949 | Stephenson | B64C 1/1484 244/129.3 |
| 6,905,094 | B2 * | 6/2005 | Dazet | B64C 1/1492 244/129.1 |
| 2007/0194177 | A1 * | 8/2007 | Coak | B64C 1/1492 244/129.3 |
| 2014/0314973 | A1 * | 10/2014 | Desroches | B64C 1/1492 428/34 |
| 2015/0330136 | A1 * | 11/2015 | Podyma | E06B 1/26 52/204.5 |

* cited by examiner

*Primary Examiner* — Richard G Davis
(74) *Attorney, Agent, or Firm* — MH2 Technology Law Group, LLP (57) ABSTRACT

A thermal barrier apparatus for a window system includes a closed curve-shaped plate having a plurality of concentric channels, a plurality of walls each defining adjacent concentric channels, each of the walls including a plurality of openings between adjacent concentric channels, an outer wall formed on an outer peripheral edge of the closed curve-shaped plate, the outer wall including a plurality of openings, and an inner wall formed on an inner peripheral edge of the closed curve-shaped plate including a plurality of openings. The plurality of openings and concentric channels are configured to provide an air flow path for conduction of air through the thermal barrier apparatus to an exterior of the thermal barrier apparatus.

20 Claims, 6 Drawing Sheets

THERMAL BARRIER APPARATUS

TECHNICAL FIELD

The present teachings relate to the field of thermal barrier apparatus and, more particularly, to a thermal barrier apparatus used in window systems, window systems of buildings, and window systems of flight vehicles such as propeller or jet-propelled vehicles, aerospace vehicles, rockets, and other vehicles that may be exposed to a high heat source.

BACKGROUND

Most current aircraft window systems include one or more panes of acrylic windows provided in a window frame of a fuselage of the aircraft. The fuselage may be, for example, a metallic or composite fuselage. Where the fuselage is a composite, which is typically made of black carbon fiber, the fuselage is painted in a lighter color so as to minimize the amount of solar energy that is absorbed by the fuselage.

If the fuselage absorbs too much solar energy, the fuselage heats up beyond an acceptable temperature and may transfer the heat from the fuselage to the window frame or the acrylic window. If the window frame or the acrylic window heats beyond an acceptable temperature, the acrylic window may deform or degrade.

In current building window systems, a window pane is provided in a window frame and a rubber seal, for example, a black rubber seal, may be provided between the window pane and the window frame. If the exterior of the building heats up to beyond an acceptable temperature, then the rubber seal between the window frame and the window pane may fail and external elements, such as moisture and hot or cold air may enter into the building.

Accordingly, there is a need for a window system that prevents or reduces deformation of the window pane and/or degradation the seal between the window pane and the window frame.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

According to the present teachings, a thermal barrier apparatus of the present disclosure may include a closed curve-shaped plate having a via in a central portion of the closed curve-shaped plate. The closed curve-shaped plate may include a plurality of concentric channels formed on a first surface of the closed curve-shaped plate; a plurality of walls, each of the plurality of walls defining adjacent concentric channels of the plurality of concentric channels, each of the plurality of walls including a plurality of openings between adjacent concentric channels; an outer wall formed on an outer peripheral edge of the closed curve-shaped plate, the outer wall including a plurality of openings; and an inner wall formed on an inner peripheral edge of the closed curve-shaped plate, the inner wall including a plurality of openings.

In the thermal barrier apparatus, a first wall of the plurality of walls may include a plurality of wall portions having an opening between adjacent wall portions and the opening between adjacent wall portions may be staggered with respect to at least one opening between adjacent wall portions of a second wall of the plurality of walls.

In the thermal barrier apparatus, a first wall of the plurality of walls may include a plurality of wall portions and an opening between adjacent wall portions and a length of the opening between adjacent wall portions may be about two times the width of an adjacent channel.

The thermal barrier apparatus may further include a frame; a first thermal barrier layer provided between the frame and a second surface of the closed curve-shaped plate; a closed curve-shaped pane provided at a portion of the second surface of the closed curve-shaped plate; and a seal provided between the closed curve-shaped pane and the second surface of the closed curve-shaped plate.

The thermal barrier apparatus may further include a second thermal barrier layer provided between the seal and the closed curve-shaped plate.

In the thermal barrier apparatus, at least two of the first thermal barrier layer, the second thermal barrier layer, and the seal may include silica aerogel.

In the thermal barrier apparatus, the frame may be a metallic frame or a composite frame including carbon fiber.

In the thermal barrier apparatus, the closed curve-shaped plate is a composite including at least fiberglass epoxy and silica aerogel.

In the thermal barrier apparatus, the composite of the closed curve-shaped plate may include 30 to 35% aerogel.

According to the present teachings, a thermal barrier apparatus includes a frame; a closed curve-shaped plate provided in the frame having a first thermal barrier layer provided between the frame and a second surface of the closed curve-shaped plate; a closed curve-shaped pane provided at a portion of the second surface of the closed curve-shaped plate; and a seal provided between the closed curve-shaped pane and the second surface of the closed curve-shaped plate.

In the thermal barrier apparatus, the closed curve-shaped plate may include a plurality of concentric channels formed on the first surface of the closed curve-shaped plate; a plurality of walls, each of the plurality of walls defining adjacent concentric channels of the plurality of concentric channels, each of the plurality of walls including a plurality of openings between adjacent concentric channels; an outer wall formed on an outer peripheral edge of the closed curve-shaped plate, the outer wall including a plurality of openings; and an inner wall formed on an inner peripheral edge of the closed curve-shaped plate, the inner wall including a plurality of openings.

In the thermal barrier apparatus, a first wall of the plurality of walls may include a plurality of wall portions having an opening between adjacent wall portions and the opening between adjacent wall portions is staggered with respect to at least one opening between adjacent wall portions of a second wall of the plurality of walls.

In the thermal barrier apparatus a first wall of the plurality of walls may include a plurality of wall portions and an opening between adjacent wall portions and a length of the opening between adjacent wall portions may be about two times the width of an adjacent channel.

The thermal barrier apparatus may further include a second thermal barrier layer provided between the seal and the closed curve-shaped plate.

In the thermal barrier apparatus, at least two of the first thermal barrier layer, the second thermal barrier layer, and the seal may include silica aerogel.

In the thermal barrier apparatus, the frame may be a metallic frame or a composite frame including carbon fiber.

In the thermal barrier apparatus, the closed curve-shaped plate may be a composite including at least fiberglass epoxy and silica aerogel.

In the thermal barrier apparatus, the composite of the closed curve-shaped plate may include 30 to 35% aerogel.

Optionally, an aircraft includes a frame; and a plurality of windows. Each of the plurality of windows may include a closed curve-shaped plate having a via in a central portion of the closed curve-shaped plate, and provided in the frame. The closed curve-shaped plate may include a plurality of concentric channels formed on a first surface of the closed curve-shaped plate; a plurality of walls, each of the plurality of walls defining adjacent concentric channels of the plurality of concentric channels, each of the plurality of walls including a plurality of openings between adjacent concentric channels; an outer wall formed on an outer peripheral edge of the closed curve-shaped plate, the outer wall including a plurality of openings; and an inner wall formed on an inner peripheral edge of the closed curve-shaped plate, the inner wall including a plurality of openings. The aircraft may further include a first thermal barrier layer provided between the frame and a second surface of the closed curve-shaped plate; and a seal provided between a second surface of the closed curve-shaped plate and a respective window of the plurality of windows.

The aircraft may further include a second thermal barrier layer provided between the second surface of the closed curve-shaped plate and the seal.

In the aircraft, at least two of the first thermal barrier layer, the second thermal barrier layer and the seal may include silica aerogel.

The features, functions, and advantages that have been discussed can be achieved independently in various implementations or may be combined in yet other implementations further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure. In the figures.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to examples of the present teachings which are illustrated in the accompanying drawings. Wherever possible, the same reference numbers will be used throughout the drawings to refer to the same or like parts.

In considering an example of an aircraft parking on the ground, the fuselage of an aircraft may absorb solar energy. The darker the fuselage, the more solar energy may be absorbed. For example, a black fuselage skin may have an absorption factor of 0.95. This solar energy, e.g., heat, may be transferred from the fuselage of the aircraft to a window system in the aircraft. In a conventional window system, the heat that is transferred to an outer pane of the conventional window system at a time of day experiencing the highest solar load may reach temperatures at or above 200 degrees Fahrenheit.

In order to address the shortcomings of conventional window systems, the present teachings relate to a thermal barrier apparatus that provides a thermal barrier between a window frame and a window pane. By providing a thermal barrier between the window frame and a window pane, heat that is absorbed at a window frame may be conducted or convected in such a manner that the transfer of heat is minimized to one or more window panes and/or seals inside the window frame.

According the present teachings, the thermal barrier apparatus may be made of a low thermal conductivity material, sufficient to insulate heat from entering into the window system. For example, material including silica aerogel or material with a thermal conductivity in a range of about 0.15 to 0.23 watts per meter kelvin (W/m-K) is sufficient to serve as thermal barrier/protection/insulation. By providing a thermal barrier apparatus of a low conductivity material, such as silica aerogel, at least some of the heat conducting from the frame to the window can be minimized. Furthermore, some of the remaining heat conducted through will be removed via convection method from the channels.

A window system installed in an aircraft that includes the thermal barrier apparatus according to the present teachings may experience a reduction in the amount of heat that is transferred to a seal and/or an outer window pane. For example, solar energy, in the form heat, may be transferred from the fuselage of the aircraft to a window system in the aircraft and reduced and/or removed from the window system via the thermal barrier apparatus. In the window system according to the present teachings, the heat that is transferred, for example, to an outer window pane of the window system at a time of day experiencing the highest solar load may reach temperatures at or below 160 degrees Fahrenheit, for example, between about 150 to 160 degrees Fahrenheit.

According to the present teachings, a thermal barrier plate may include a plurality of channels separated by a plurality of walls. Each of the walls may include a plurality of openings such that air may flow from one channel to another channel, thereby creating convection to vent the heat that is absorbed at and around the window frame away from the window pane, as more fully discussed below.

By providing a thermal barrier apparatus between the window frame and the window pane, the amount of heat that is transferred from the window frame to the window pane and the seal between the window pane and the window frame, may be reduced.

The present teachings may provide a thermal barrier apparatus that protects a seal and/or a window pane from temperature extremes while maintaining structural integrity of the seal and/or the window pane. Since the structural integrity of the seal and/or window pane may be maintained, because the amount of heat that is transferred from the window frame to the seal and window pane is reduced, the number of times maintenance may need to be performed to repair seals or window panes in window systems utilizing the thermal barrier apparatus in comparison with window systems that do not include thermal barrier apparatus may be reduced, Window panes aging due to wearing of edge is known to be related to high frequency exposure to peak heat load into the window system. During maintenance check, if the window panes indicated sign of wear, then window panes are replaced. By applying the thermal apparatus as discussed herein, peak heat load may be reduced and hence it can reduce edge wearing of the window and consequently reduce maintenance cost and part replacements.

Further, by providing the thermal barrier apparatus and/or the window system as discussed herein, a portion of the window frame is replaced with a lighter material, namely the fiberglass epoxy and/or silica aerogel as discussed below, the weight of the flight vehicle may be reduced. Conventional window frames may be made out of metal or a composite fuselage. Fiberglass epoxy is 43% lighter than aluminum. In the case of a metallic window frame, a portion of metal is carved out of the window frame and replaced with, for example, fiberglass, thereby resulting in weight reduction. Hence, improved fuel burn for the airplane may be appreciated.

FIGS. 1-6 and the narrative below present a description of the present teachings. It will be understood that the figures represent generalized schematic illustrations where other structures may be added and existing structures may be removed or modified.

Although the following figures discuss example implementations of window systems in a flight vehicle, it will be appreciated that the window systems discussed herein may be implemented in window systems of buildings, and window systems of other types of vehicles such as jet-propelled vehicles, aerospace vehicles, rockets, and other vehicles that may be exposed to a high heat source as more fully discussed below. Further, although examples are provided herein regarding the configuration and composition of the thermal barrier apparatus and the window systems, different window systems may experience difference thermal properties. By modeling the thermal properties of a particular system, the configuration and composition of the components of the window system may be optimized in order to maximize the amount of heat that may be removed from the window system, thereby reducing the degradation of the seal and/or the window pane in the window system over time. Specifically, materials used to form the thermal barrier plate, the thickness of the thermal barrier plate, the number of channels, the width of the openings between wall portions in the each of the walls, the length of the wall portions, the presence and/or thickness of the thermal barrier layers, and the materials used to form the seal, all may be optimized using modeling and optimization algorithms to remove heat from the window system based on the thermal properties of the window system.

Figure 1:
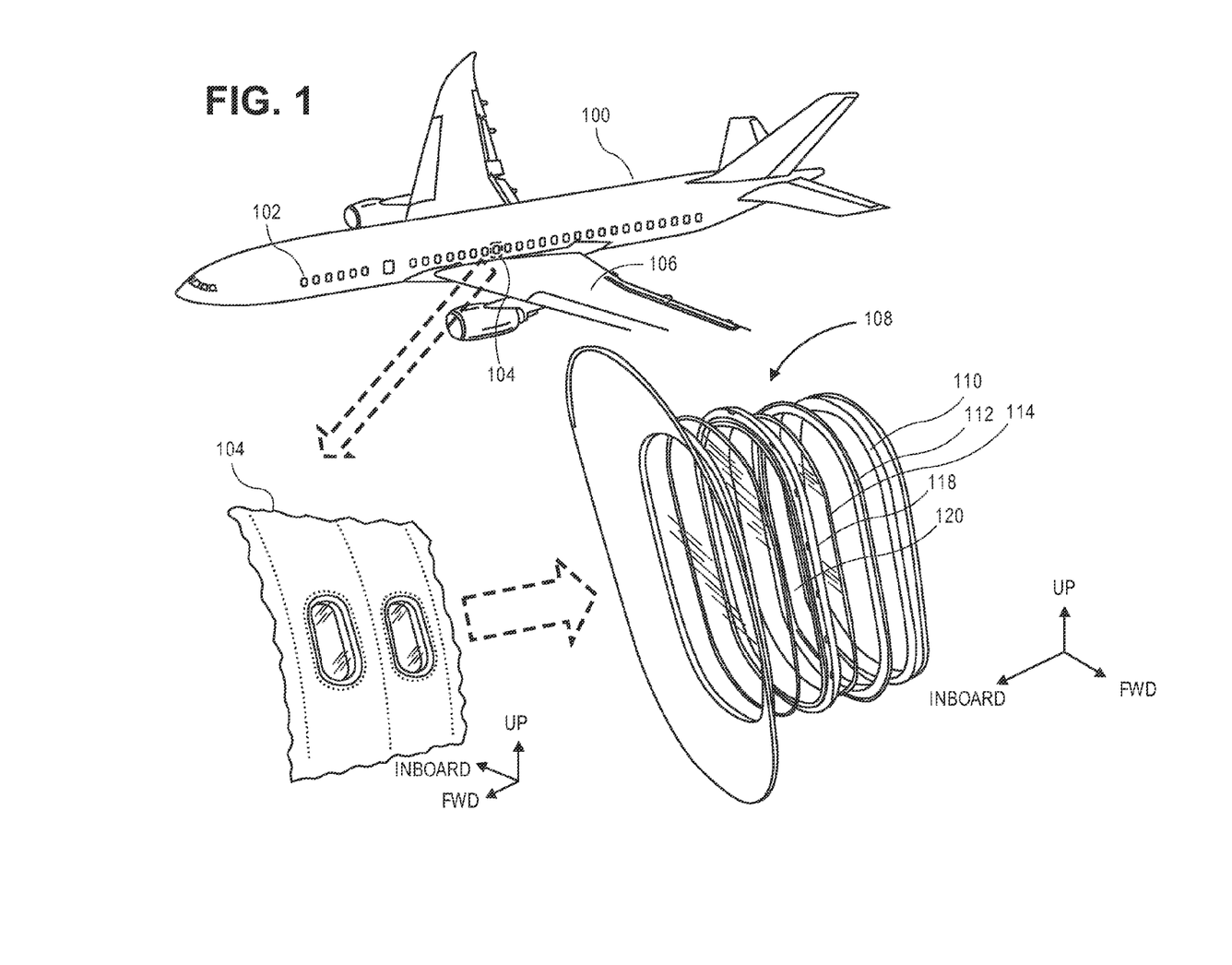
FIG. 1 depicts a flight vehicle within which a thermal barrier apparatus of the present disclosure may be employed, in accordance with the present disclosure.

FIG. 1 is an example depiction of a flight vehicle such as an aircraft 100 in accordance with the present disclosure. Aircraft 100 includes one or more windows 102 that are located at different positions on the aircraft 100.

Panel 104 includes a window system 108 installed in the fuselage of the aircraft 100 and, in this example, is provided in a position that is above a wing 106 of the aircraft 100. Window system 108 includes a window frame 110, a thermal barrier plate 112, an outer pane 114, a seal 118, and an inner pane 120.

Figure 2:
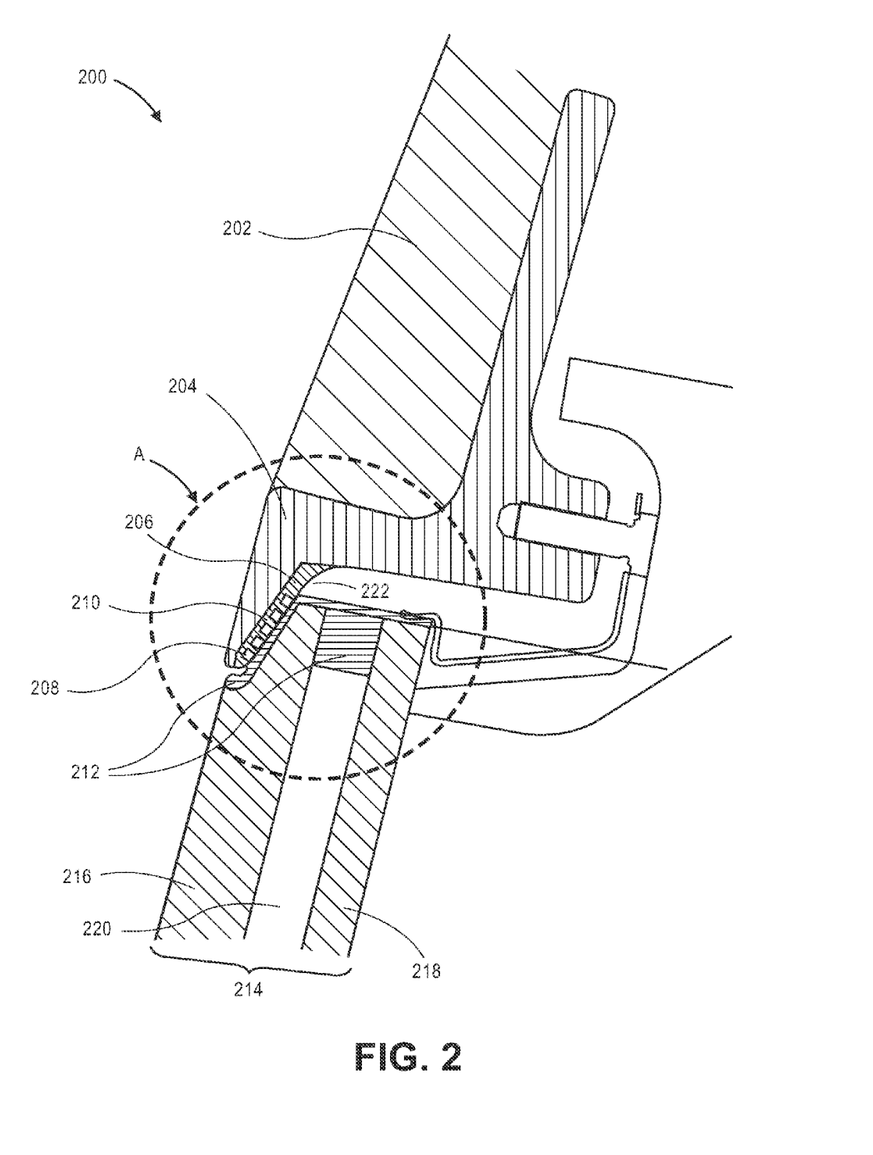
FIG. 2 depicts a cross-section of a wall including the thermal barrier apparatus of the flight vehicle of FIG. 1, in accordance with the present disclosure.

FIG. 2 depicts a cross-section of an example window system 200 of aircraft 100 depicted in FIG. 1. As shown in FIG. 2, a fuselage 202 of the aircraft 100 is provided. A window frame 204 is provided in the fuselage 202. The window frame may be implemented as a metallic window frame, as a composite window frame, a graphite or carbon fiber window frame, or may be implemented as including other types of materials.

The thermal barrier apparatus or plate 206 may be implemented in a shape that is similar to the shape of the window pane. In the example discussed with regard to FIG. 2, thermal barrier apparatus 206 may be implemented as a closed curve-shaped plate, for example, a circular or oval shaped, or generally circular or oval shaped plate, or may be implemented as other shapes. The plate may be implemented as a flat or generally flat plate, or may be tapered as discussed below.

According to the present teachings, the thermal barrier apparatus 206 may have a plurality of channels 208 separated by a plurality of walls 210. Each of the plurality of walls may have a plurality of openings (not shown in FIG. 2, see FIG. 5) such that air may flow through the plurality of channels 208 and out of the thermal barrier apparatus 206 at an opening 222 thereby removing heat from the window system.

The thermal barrier apparatus 206 may be made of a low thermal conductivity material with sufficient stiffness and compression capability. According to the present teachings, thermal barrier apparatus 206 may be made of fiberglass epoxy having a thermal conductivity in a range of about 0.15 to 0.23 watts per meter kelvin (W/m-K)). For example, a range of fiberglass epoxy stiffness is $2\times10^6$ to $3.5\times10^6$ pounds per square inch (psi).

Optionally, the thermal barrier apparatus 206 may be made of a composite material, for example a composite of fiberglass epoxy and silica aerogel to improve thermal resistance of the barrier plate. Optionally, the composite material of the thermal barrier apparatus 206 may be 30% to 35% silica aerogel and 65% to 70% fiberglass epoxy such that the composite material of the thermal barrier apparatus 206 may provide lower overall thermal conductivity of epoxy material system in the range between about 0.10 to 0.03 watts per meter kelvin (W/m-K). The thermal conductivity may be determined via one or more known measurement methods. Alternatively, formulating the material may be first estimated using a ratio of mixtures and then tested using one or more known testing methods.

Optionally, thermal barrier apparatus 206 may be implemented without the channels and walls such that the thermal barrier apparatus 206 insulates the seal and the window pane based solely on the low thermal conductivity properties of the material(s) used to make the thermal barrier plate.

The thermal barrier apparatus or plate 206, when installed in the window system, may be provided at an interior side of, or inside a carved-out portion of, the window frame 204 such that a first surface of the plate 206 including the plurality of channels is facing in-board, or inward toward the interior of the aircraft, and a second surface of the plate 206 is facing outboard, or toward an out side of the aircraft. Optionally, the thermal barrier apparatus or plate 206, when installed in the window system, may be provided in the interior side of, or inside a carved-out portion of the window frame 204 such that the first surface of the plate is facing outboard, or outward toward the outside of the aircraft, and the second surface of the plate is facing inboard, or inward toward the interior of the aircraft.

Referring back to FIG. 2, a seal 212 may be provided between the thermal barrier apparatus 206 and a window pane 214. Optionally, the seal 212 may be implemented as a rubber seal. Optionally, seal 212 may be a composite of rubber and silica aerogel to further reduce thermal conductivity of seal 212. Optionally, the seal 212 may be 70% or more silica aerogel and 30% or less of rubber. By providing 30% or less of rubber, hyperelasticity of thermal barrier apparatus may be maintained while the 70% or more of silica aerogel may provide thermal insulating properties of the thermal barrier apparatus.

The window pane 214 (pane) may be implemented as having an outer pane 216 and an inner pane 218 where an air gap 220 may be provided therebetween. Optionally, the window pane 214 may be implemented where the outer pane 216 and the inner pane 218 are adhered together such that there is no air gap 220 therebetween. Optionally, the window pane may be implemented as a single pane.

The outer pane 216 and inner pane 218 may be made of acrylic or other suitable optically transparent materials. Optionally, for example where the window system is installed in a building, the window pane may be made of glass or other suitable materials.

Figure 3:
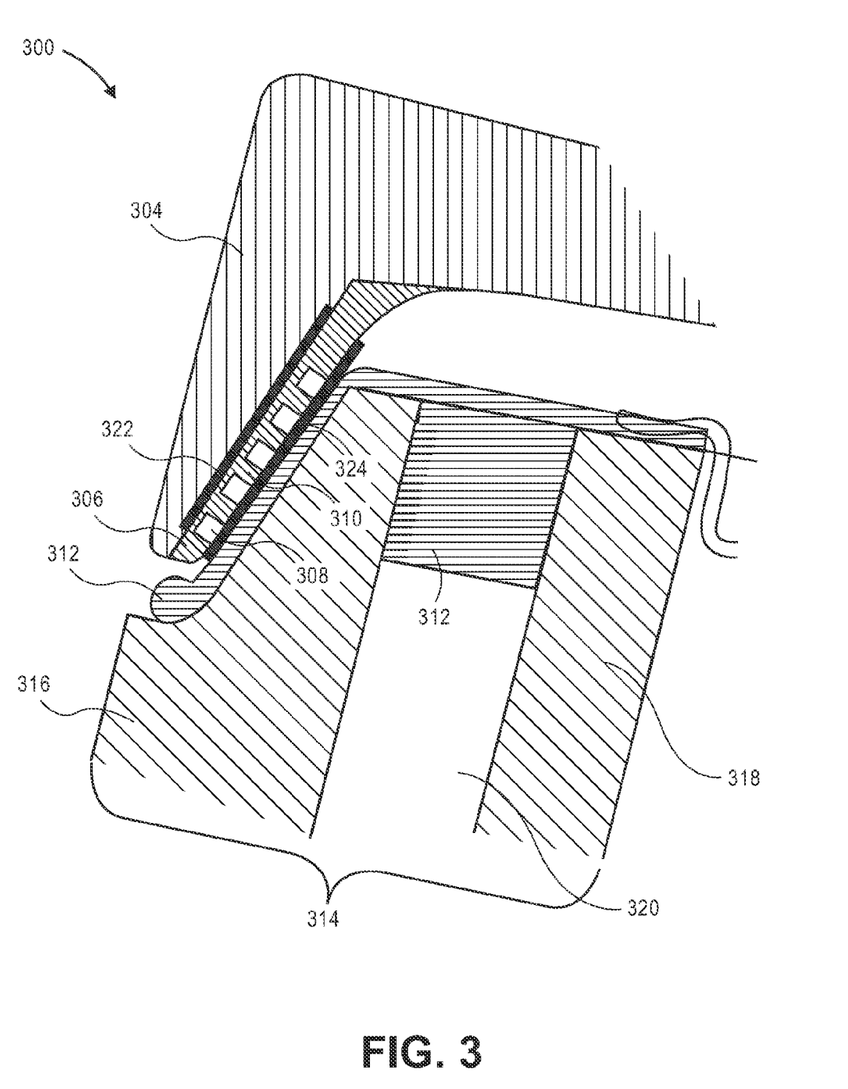
FIG. 3 depicts an enlarged view of section A of the cross-section of the wall including the thermal barrier apparatus depicted in FIG. 2, in accordance with the present disclosure.

FIG. 3 is an example enlarged view of section A of FIG. 2 with additional modifications to a window system according to the present teachings. The properties of the elements of FIG. 3 are the same as the properties of the similar elements depicted in FIG. 2, except where noted below.

Window system 300 includes window frame 304, thermal barrier apparatus or plate 306, channels 308, walls 310, seal 312, window pane 314, outer pane 316, inner pane 318 and gap 320.

Optionally, the window system 300 may include a thermal barrier layer 322 (first thermal barrier layer), for example, a silica aerogel layer, provided between the window frame 304 and the thermal barrier plate 306.

Optionally, the window system 300 may further include a thermal barrier layer 324 (second thermal barrier layer), for example, a silica aerogel layer, provided between the thermal barrier plate 306 and seal 312. The thermal barrier layers 322 and 324 may be implemented as an ultra low conductive coating made out of silica aerogel, for example, of about 0.017 watts per kelvin meter (W/m-K). For example, a suitable ultra low conductive coating may by any material that has thermal conductivity that is lower than 0.025 watts per Kelvin meter is considered as low thermal conductive material.

Thermal barrier layer 324 may be implemented with material with sufficient stiffness such that the seal 312 will not bulge into the channels 308, but instead will press on seal 312 such that there is no deformation of seal 312. For example, a thermal barrier having a stiffness in the range of $2 \times 10^6$ to $3.5 \times 10^6$ pounds per square inch may be considered sufficient.

Optionally, thermal barrier layers 322, 324 may be implemented as having uniform thickness. Optionally, the thermal barrier layers 322, 324 may be implemented where the thickness varies. For example, the thickness of the thermal barrier layers may taper inwardly or outwardly.

By providing one or more of the thermal barrier layers 322, 324, the seal 312, and thermal barrier plate 306, adequate protection of the window pane 314 from high heat conducting from the window frame 304 may be provided by insulating the window pane 314 from the heat that is absorbed at the window frame 304.

In addition, where channels are provided in the thermal barrier plate 306, additional protection of the window pane 314 from high heat conducting from the window frame 304 may be provided.

Figure 4:
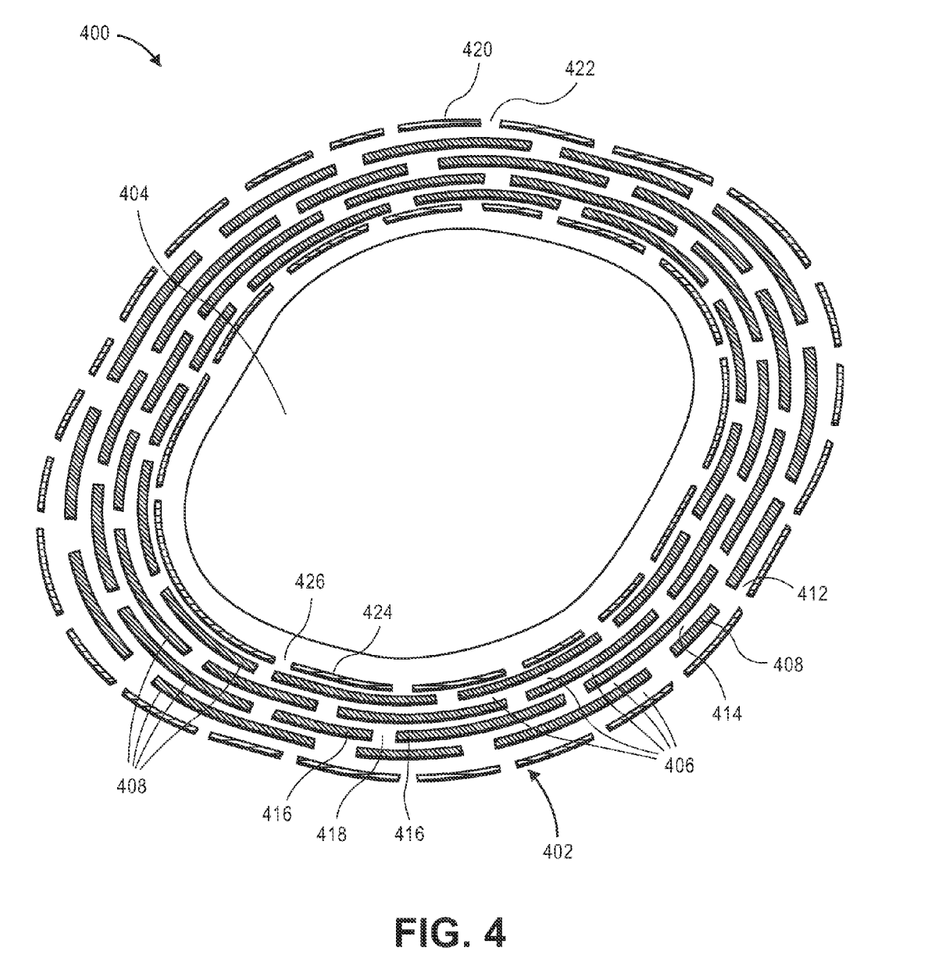
FIG. 4 depicts a perspective view of a thermal barrier plate, in accordance with the present disclosure.

FIG. 4 depicts an example of a thermal barrier apparatus according to the present teachings. Thermal barrier apparatus 400 may be implemented as thermal barrier apparatus or plate 206 or thermal barrier apparatus or plate 306. As can be seen in FIG. 4, thermal barrier apparatus 400 includes a plate 402. As noted above, plate 402, may be a closed curve-shaped plate. The plate 402 may have a via 404 in the central portion of the closed curve-shaped plate.

The plate 402 may be implemented as a closed curve-shaped and may include a plurality of channels 406. The channels 406 may be implemented as, for example, concentric channels, formed on a first surface of the plate 402. Plate 402 may further include a plurality of walls 408. Each of the plurality of walls defines adjacent channels. For example, wall 408 is provided between, and therefore defines, channels 412 and 414 as being adjacent channels. Each of the plurality of walls includes a plurality of wall portions 416. An opening 418 is provided between two wall portions 416 of wall 408. The openings are provided between adjacent concentric channels such that air flows from one channel to an adjacent channel through the openings in the walls between the adjacent channels.

Plate 402 further includes an outer wall 420 formed on an outer peripheral edge of the plate 402. The outer wall 420 includes a plurality of openings 422 such that air may flow between the plurality of channels to outside of the plate 402 via the openings 422, and from outside of (i.e., exterior to) the plate 402 to the plurality of channels via the openings 422, depending on the orientation of the plate 402 with respect to the window frame, as more fully discussed below with regard to FIG. 5.

Plate 402 further includes an inner wall 424 formed on an inner peripheral edge of the plate 402. The inner wall 424 includes a plurality of openings 426 such that air may flow between the plurality of channels to outside of the plate 402 via the openings 426, and from outside of the plate 402 to the plurality of channels via the openings 426, depending on the orientation of the plate 402 with respect to the window frame, as more fully discussed below with regard to FIG. 5.

The plate 402 may be formed for example, by laminating fiberglass epoxy and curing the layered fiberglass epoxy such that the plate 402 is a desired thickness. A plurality of channels may be carved out of a first surface of the plate 402 having a desired depth. Openings may be carved out of walls between the plurality of channels, where the openings have a desired position and width, as more fully discussed with regard to FIG. 5.

Figure 5:
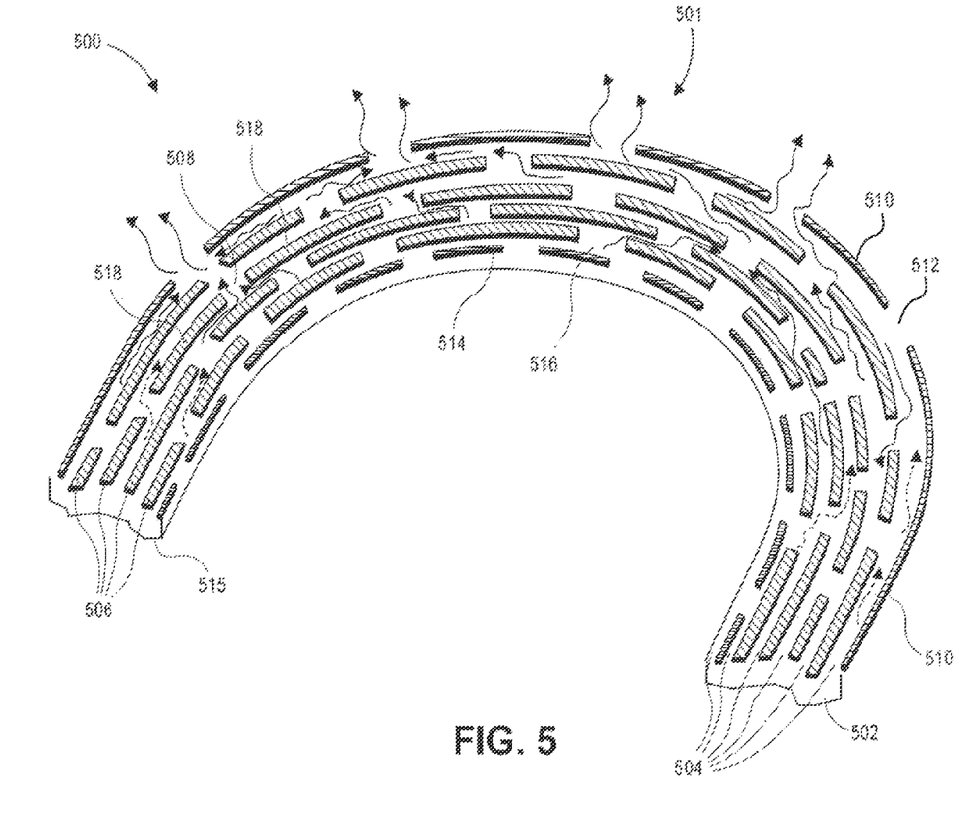
FIG. 5 is a perspective view of a cross section of a thermal barrier plate, in accordance with the present disclosure.

FIG. 5 is a perspective view of an upper portion 500 of thermal barrier plate 400 depicted in FIG. 4. The upper portion 500 of the thermal barrier plate 400 is provided such that the when the thermal barrier plate 400 is installed in the window system, part 501 of the thermal barrier plate 400 is positioned closest to a top side of the aircraft 100. FIG. 5 includes plate 502. Plate 502 may be a closed curve-shaped plate that is flat, or generally, flat. Alternatively, plate 502 may be tapered or may be thicker in some areas than others in order to provide additional protection to areas of the seal and/or the window pane that may experience higher heat than others. Thus, the thickness of the plate 502 may depend on the heat properties of the window system. Plate 502 includes a plurality of channels 504 and a plurality of walls 506. Each of the walls 506 includes a plurality of openings 508.

Each of the plurality of walls 506 includes a plurality of wall portions 518. An opening 508 is provided between the wall portions 518. The openings of one wall may be staggered with respect to the openings of an adjacent wall (i.e., a wall on an opposite side of the adjacent channel). Optionally, each of the wall portions of one wall may be the same length, for example, about 1 to 2 inches. Optionally, one or more of the wall portions of one wall may be a different length. Optionally, the wall portions of all of the walls may be the same length, for example, about 1 to 2 inches. Optionally, one or more of the wall portions of all of the walls may be different lengths.

The surface areas of the walls assist in convection heat transfer. The heat from the surface of the walls is convected through air movement along the surface. The larger the surface area the more heat can be transferred. On the other hand, too large of surface area will require more walls. More walls in limited space result in narrow channels and may result in less air volume that may pass through the channels and consequently lesser heat can be removed from the surface. Furthermore, when channel width becomes the size comparable to boundary layers, then the mass flow rate through the channels drop substantially and adversely affecting heat transfer from the systems. The number and width of channels, and the number and the size of the wall portions, and the openings between the wall portions may be optimized based on the thermal properties of the particular window system Optionally, the ratio of the width of the openings between wall portions to the width of the channel may be about 2 to 1. The ratio may be larger or smaller depending on the thermal characteristics of the window system. Optionally, the width of the openings between wall portions may be larger than the width of the adjacent channels.

Optionally, the wall openings may be larger than the channel width because it provides a higher pressure drop at the openings and results in air flowing into the openings and transitions to adjacent channels where pressure is lower. Where the size of the openings is double the size of the channel, this ensures there is sufficient pressure drop provided. Further since the opening is parallel to the flow of air, an opening that is larger than the channel width ensures a sufficient amount of air flow can move through the opening.

Plate 502 includes an outer wall 510. The outer wall 510 includes a plurality of openings 512. Plate 502 further includes an inner wall 514. Inner wall 514 includes a plurality of openings 516.

FIG. 5 further includes a plurality of arrows indicting the path of the air flow through the plate 502. As can be seen by the arrows in FIG. 5 cool air (represented by the dotted arrows) enters through the openings 516 of the inner wall 514 of the upper portion 500 of the plate 502. The air moves along the plurality of channels 504 and passes from one channel to another channel through the openings 508 of the walls 506. A second surface 515 of the plate 502 is in contact with, for example, a thermal barrier layer, as discussed above, or an adhesive that attaches the thermal barrier plate to the window frame. Heat is transferred from the thermal barrier layer, or the window frame, to a second surface of the plate 502. As cool air moves through the channels and openings, heat is removed from the walls via the cool air and the cool air heats up (represented by the solid-line arrows) and rises through the plate 502, thereby creating convention that pulls more air in through the openings 516 of the inner wall 514.

Although not depicted, a lower portion of plate 502 functions similarly to the function of the upper portion 500 of the plate 502. Namely, cool air enters through openings in an outer wall of the bottom portion of the plate 502. As the air moves through the channels, and the openings in the walls, the air removes the heat from the walls and leaves the plate 502 through openings in the inner wall of the bottom portion of the plate 502.

Thus, the cooler air enters from the bottom of the plate 502. As the air heats up by removing the heat from the walls as it moves through the channels, it rises out of the openings in the inner wall of the bottom portion of the plate 502. Further, the heated air rises to the upper portion 500 of the plate 502 and exits through the openings of the outer wall of the plate 502.

As can be seen by this process, heat from the window frame may be removed from the area of the window frame and window pane such that the temperature of the seal and the window may remain at an acceptable temperature.

The amount of heat that is removed from the plate 502 depends on the amount of heat in the system and further depends on size and the number of channels in the plate. The size and number of channels may be optimized. For example, increasing the number of channels, and therefore the number of walls, increases the amount of surface area in contact with the window or a thermal barrier layer. This increases the amount of heat that may be transferred to the walls of the thermal barrier apparatus and removed through the convection process. However, if there are too many channels in the plate 502, there may be insufficient amount of space for the air to flow in order to remove the heat from the walls. An example of the configuration of the plate 502 is provided below.

The configuration and the properties of the thermal barrier plate may be adjusted based on the location of the window, or the thermal properties of the window frame. For example, the window systems above a wing of an aircraft may be exposed to higher temperatures than the window systems located near a nose of an aircraft. The number of channels, the width of the channels, the length of the wall portions, and the length of the openings, may be adjusted in order to ensure a sufficient amount of heat is removed via the thermal barrier plate and therefore is not transferred to the seal or the window pane.

Further, the presence of one or more thermal barrier layers may depend on how much heat may be in the window system. For example, if an upper threshold of temperature of a window system is such that the thermal barrier plate is sufficient to remove the heat from the window frame thereby avoiding degradation of the seal and the window pane, then the window system may not include one or more of the thermal barrier layers noted above and may be implemented with the thermal barrier plate without the channels and walls, or a thermal barrier plate with the channels and walls.

Alternatively, if an upper threshold of temperature of a window system is such that the thermal barrier plate is not sufficient to remove the heat from the window frame to avoid degradation of the seal and the window pane, then the window system may include the thermal barrier layers noted above in addition to the thermal barrier plate without the channels and walls, or a thermal barrier plate with the channels and walls.

Figure 6:
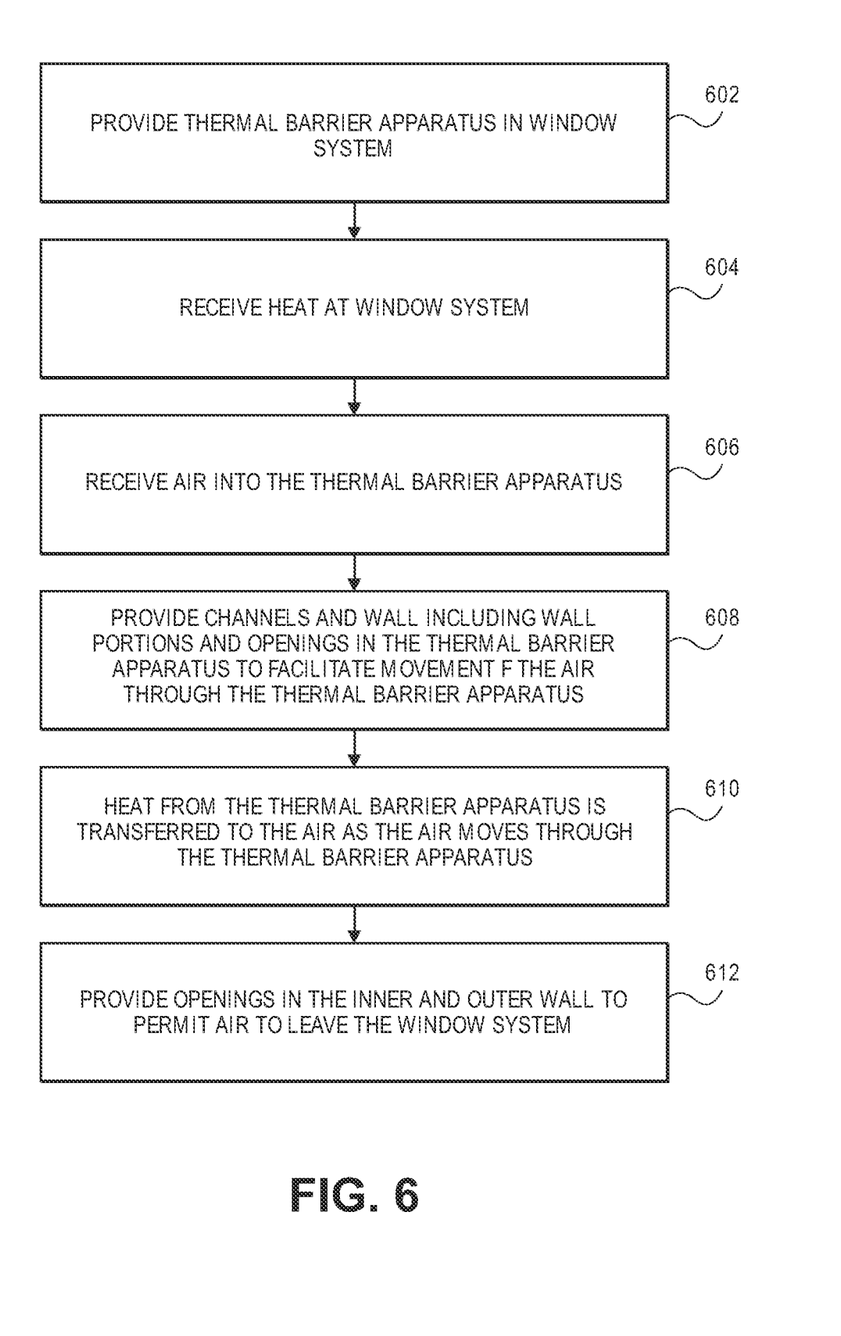
FIG. 6 is a flow diagram of a method to remove heat from a window system, according with the present disclosure.

FIG. 6 depicts a flow diagram of a method for removing heat from a window system according to the present teachings. As shown in FIG. 6, a thermal barrier apparatus and window frame are provided in a window system (block 602). Heat is received at the window system (block 604). The heat may be received due to solar load or to other external sources. The window system may receive air through one or more openings in an outer wall of a lower portion of the thermal barrier apparatus or an inner wall in an upper portion of the thermal barrier apparatus (block 606). A plurality of channels and walls separating the channels is provided in the thermal barrier apparatus such that the air may move through a plurality of channels via openings between wall portions in the walls separating the changes in the thermal barrier apparatus (block 608). As the air moves through the plurality of channels, heat that is present in the thermal barrier apparatus, including the wall portions of the thermal barrier apparatus, is transferred to the air (block 610). As the air heats up, the air rises and exits out of the thermal barrier apparatus through one or more openings in the inner wall of the lower portion of the thermal barrier apparatus or through one or more openings in an outer wall of the upper portion of the thermal barrier apparatus (block 612). Thus, heat is removed from the window system.

The following is a specific example of a configuration of a window system including a thermal barrier plate for a window 102 located in aircraft 100 as depicted in FIG. 1.

As noted above a window system includes window frame, thermal barrier plate, channels, walls, seal, window pane, outer pane, inner pane and gap. In accordance with this specific example, the outer pane has an approximate thickness of 0.40 inches. The inner pane has an approximate thickness of 0.22 inches. The outer pane and the inner pane are separated by air gap of 0.27 inches.

The seal is made out of 70% silica aerogel and 30% silicone rubber and has an approximate thickness of 0.037 inches that wraps around the edge of the outer pane and inner pane. The seal extends from an edge of outer pane and inner pane into the gap a distance of 0.285 inches.

The thermal barrier plate is made out of 30% silica aerogel and 70% of fiber glass epoxy matrix system and has a plate thickness of 0.077 inches. The thermal barrier plate has five concentric channels carved out each having a channel width of 0.065 inches and depth of 0.045 inches. The thickness of the all of the wall portions is approximately of 0.025 inches. The length of all of the wall portions is approximately 1 inch, and the length of the openings between the wall portions is 0.130 inches. The width of the thermal barrier plate is approximately 0.55 inches.

The window system according to this example may optionally include a first and/or a second thermal barrier layer. For example, the thermal barrier layers may have a thickness of 0.050 inches. The thermal barrier layers may have a thickness in a range of 0.050 inches to 0.3 inches. More specifically, the thermal barrier layers may have a thickness in a range of 0.050 inches to 0.15 inches.

The plate may be implemented as a closed curve-shaped and may include a plurality of channels. The channels may be implemented as, for example, concentric channels, formed on a first surface of the plate. Plate may further include a plurality of walls. Each of the plurality of walls includes a plurality of wall portions where the length of the wall portions is approximately 1 inch. An opening is provided between two wall portions of wall 88. A length of the wall openings is approximately 0.13 inches. The openings are provided between adjacent concentric channels such that air flows from one channel to an adjacent channel through the openings in the walls between the adjacent channels.

Thus it will be understood that, according to the present teachings, a thermal barrier apparatus is provided that includes a closed curve-shaped plate having a via in a central portion of the closed curve-shaped plate. The closed curve-shaped plate includes a plurality of concentric channels formed on a first surface of the closed curve-shaped plate; a plurality of walls, each of the plurality of walls defining adjacent concentric channels of the plurality of concentric channels, each of the plurality of walls including a plurality of openings between adjacent concentric channels; an outer wall formed on an outer peripheral edge of the closed curve-shaped plate, the outer wall including a plurality of openings; and an inner wall formed on an inner peripheral edge of the closed curve-shaped plate, the inner wall including a plurality of openings.

According to the present teachings, the thermal barrier plate may be installed in a window frame where a first thermal barrier layer is provided between the frame and a second surface of the closed curve-shaped plate. The closed curve-shaped plate may be provided at a portion of the second surface of the first thermal barrier layer. In other words, the first thermal barrier layer may extend beyond one or more edges of the closed curve-shaped plate. A seal may be provided between the window pane and the first surface of the closed curve-shaped plate.

According to the present teachings, a thermal barrier apparatus is provided that includes a frame; a closed curve-shaped plate provided in the frame having a first thermal barrier layer provided between the frame and a second surface of the closed curve-shaped plate; a closed curve-shaped pane provided at a portion of a second surface of the first thermal barrier layer; and a seal provided between the pane and the first surface of the closed curve-shaped plate.

According to the present teachings, a thermal barrier apparatus is provided and includes a frame; a closed curve-shaped plate provided in the frame having a first thermal barrier layer provided between the frame and a second surface of the closed curve-shaped plate; a closed curve-shaped pane provided at a portion of the first surface of the closed curve-shaped plate; and a seal provided between the pane and the first surface of the closed curve-shaped plate.

According to the present teachings, an aircraft includes a frame and a plurality of windows. Each of the plurality of windows includes a closed curve-shaped plate having a via in a central portion of the closed curve-shaped plate, and provided in the frame. The closed curve-shaped plate includes a plurality of concentric channels formed on a first surface of the closed curve-shaped plate; a plurality of walls, each of the plurality of walls defining adjacent concentric channels of the plurality of concentric channels, each of the plurality of walls including a plurality of openings between adjacent concentric channels; an outer wall formed on an outer peripheral edge of the closed curve-shaped plate, the outer wall including a plurality of openings; and an inner wall formed on an inner peripheral edge of the closed curve-shaped plate. The inner wall includes a plurality of openings. A first thermal barrier layer is provided between the frame and a second surface of the closed curve-shaped plate. A seal is provided between a first surface of the closed curve-shaped plate and a respective window of the plurality of windows.

The technology described herein may be used in any window system where thermal protection is desired. Examples include, but are not limited to, buildings, aerospace vehicles, military, commercial, or private flight vehicles, reusable spacecraft, and window systems for military, commercial, or private purposes, ground-based vehicle systems, weapons systems, missiles, rockets, propulsion and afterburner systems, and re-entry systems. As used herein, "aircraft" refers to any vehicle capable of flight within an atmosphere, partial vacuum, and/or vacuum.

To the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials. The term "about" indicates that the value listed may be somewhat altered, as long as the alteration does not result in nonconformance of the process or structure to the present teachings.

Terms of relative position as used in this application are defined based on a plane parallel to the conventional plane or working surface of a workpiece, regardless of the orientation of the workpiece.

The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. A thermal barrier apparatus for a window system comprising a closed curved-shaped plate having a via in a central portion, the closed curve-shaped plate further comprising:
   a plurality of walls, wherein:
      each wall of the plurality of walls is concentric with each other wall of the plurality of walls;
      the plurality of walls define a plurality of adjacent concentric channels separated from an adjacent concentric channel by one of the walls;
      each wall of the plurality of walls comprises a plurality of wall portions, wherein each wall portion of the plurality of wall portions of each wall is separated from an adjacent wall portion by an opening through the wall;
      the plurality of walls further comprises an outer wall formed on an outer peripheral edge of the closed curve-shaped plate, the outer wall comprising a plurality of outer wall portions, with each outer wall portion separated from an adjacent outer wall portion by an opening through the outer wall;
      the plurality of walls further comprises an inner wall formed on an inner peripheral edge of the closed curve-shaped plate, the inner wall comprising a plurality of inner wall portions, with each inner wall portion separated from an adjacent inner wall portion by an opening through the inner wall; and
   the plurality of openings and concentric channels are configured to provide an air flow path for conduction of air through the thermal barrier apparatus to an exterior of the thermal barrier apparatus.

2. The thermal barrier apparatus of claim 1, wherein:
   the plurality of walls comprises a first wall and a second wall;
   the first wall is adjacent to the second wall and separated by one of the channels; and
   each opening between adjacent wall portions of the first wall is staggered with respect to at least one opening between adjacent wall portions of the second wall.

3. The thermal barrier apparatus of claim 1, wherein at least one of the openings in at least one wall of the plurality of walls comprises that is about two times a width of a channel adjacent to the at least one wall.

4. The thermal barrier apparatus of claim 1, further comprising:
   a frame;
   a first thermal barrier layer provided between the frame and a second surface of the closed curve-shaped plate;
   a closed curve-shaped pane provided at a portion of a first surface of the closed curve-shaped plate; and
   a seal provided between the closed curve-shaped pane and the first surface of the closed curve-shaped plate.

5. The thermal barrier apparatus of claim 4, further comprising:
   a second thermal barrier layer provided between the seal and the closed curve-shaped plate.

6. The thermal barrier apparatus of claim 5, wherein at least two of the first thermal barrier layer, the second thermal barrier layer, and the seal comprises silica aerogel.

7. The thermal barrier apparatus of claim 4, wherein the frame is a metallic frame or a composite frame comprising carbon fiber.

8. The thermal barrier apparatus of claim 1, wherein the closed curve-shaped plate is a composite comprising at least fiberglass epoxy and silica aerogel.

9. The thermal barrier apparatus of claim 8, wherein the composite of the closed curve-shaped plate comprises 30% to 35% aerogel.

10. The thermal barrier apparatus of claim 1, wherein the plurality of walls are oriented toward the via.

11. A window system, comprising:
   a window frame;
   a closed curve-shaped plate provided in the window frame comprising a thermal barrier, the thermal barrier comprising a first thermal barrier layer provided between the window frame and a second surface of the closed curve-shaped plate, the closed curved-shaped plate further comprising a plurality of walls, wherein:
      each wall of the plurality of walls is concentric with each other wall of the plurality of walls;
      the plurality of walls define a plurality of adjacent concentric channels separated from an adjacent concentric channel by one of the walls;
      each wall of the plurality of walls comprises a plurality of wall portions, wherein each wall portion of the plurality of wall portions of each wall is separated from an adjacent wall portion by an opening through the wall;
      the plurality of walls further comprises an outer wall formed on an outer peripheral edge of the closed-shaped plate, the outer wall comprising a plurality of outer wall portions, with each outer wall portion separated from an adjacent outer wall portion by an opening through the outer wall;
      the plurality of walls further comprises an inner wall formed on an inner peripheral edge of the closed curved-shaped plate, the inner wall comprising a plurality of inner wall portions, with each inner wall portion separated from an adjacent inner wall portion by an opening through the inner wall; and
      the plurality of openings and concentric channels are configured to provide an air flow path for conduction of air through the thermal barrier to an exterior of the thermal barrier;
   a closed curve-shaped window pane provided at a portion of a first surface of the closed curve-shaped plate; and
   a seal provided between the closed curve-shaped window pane and the first surface of the closed curve-shaped plate.

12. The window system of claim 11, wherein:
the plurality of walls comprises a first wall and a second wall;
the first wall is adjacent to the second wall and separated by one of the channels; and
each opening between adjacent wall portions of the first wall is staggered with respect to at least one opening between adjacent wall portions of the second wall.

13. The window system of claim 11, wherein at least one of the openings in at least one wall of the plurality of walls comprises a length that is about two times a width of a channel adjacent to the at least one wall.

14. The window system of claim 11, further comprising:
a second thermal barrier layer provided between the seal and the closed curve-shaped plate.

15. The window system of claim 14, wherein at least two of the first thermal barrier layer, the second thermal barrier layer, and the seal comprises silica aerogel.

16. The window system of claim 11, wherein the window frame is a metallic window frame or a composite window frame comprising carbon fiber.

17. The window system of claim 11, wherein the closed curve-shaped plate is a composite comprising at least fiberglass epoxy and silica aerogel.

18. The window system of claim 17, wherein the composite of the closed curve-shaped plate comprises 30 to 35% aerogel.

19. An aircraft, comprising:
a window frame; and
a plurality of windows, each of the plurality of windows comprising a closed curve-shaped plate having a via in a central portion of the closed curve-shaped plate, and provided in the window frame, the closed curve-shaped plate further comprising:
a plurality of walls, wherein:
each wall of the plurality of walls is concentric with each other wall of the plurality of walls;
the plurality of walls define a plurality of adjacent concentric channels separated from an adjacent concentric channel by one of the walls;
each wall of the plurality of walls comprises a plurality of wall portions, wherein each wall portion of the plurality of wall portions of each wall is separated from an adjacent wall portion by an opening through the wall;
the plurality of walls further comprises an outer wall formed on an outer peripheral edge of the closed curve-shaped plate, the outer wall comprising a plurality of outer wall portions, with each outer wall portion separated from an adjacent outer wall portion by an opening through the outer wall;
the plurality of walls further comprises an inner wall formed on an inner peripheral edge of the closed curve-shaped plate, the inner wall comprising a plurality of inner wall portions, with each inner wall portion separated from an adjacent inner wall portion by an opening through the inner wall;
a first thermal barrier layer provided between the window frame and a second surface of the closed curve-shaped plate; and
a seal provided between a first surface of the closed curve-shaped plate and a respective window of the plurality of windows.

20. The aircraft of claim 19, further comprising:
a second thermal barrier layer provided between the first surface of the closed curve-shaped plate and the seal.

* * * * *